United States Patent
Daniel et al.

[11] Patent Number: 5,855,414
[45] Date of Patent: Jan. 5, 1999

[54] DEVICE FOR LOCKING A MOVABLE ELEMENT OF AN AUTOMOBILE VEHICLE SEAT ONTO A FIXED ELEMENT WITH UNLOCKING INDICATION

[75] Inventors: Patrick Daniel, Paris; Bernard Denis, Montlery, both of France

[73] Assignee: Bertrand Faure Equipements S.A., Boulogne Cedex, France

[21] Appl. No.: 933,831

[22] Filed: Sep. 19, 1997

[30] Foreign Application Priority Data

Sep. 19, 1996 [FR] France .................................. 96 11579

[51] Int. Cl.$^6$ ....................................................... B60N 2/02
[52] U.S. Cl. ................................ 297/378.13; 297/378.12; 296/65.1
[58] Field of Search ......................... 297/378.13, 378.12, 297/378.1; 296/63, 68.1, 65.1; 70/432, 261

[56] References Cited

U.S. PATENT DOCUMENTS

| | | | |
|---|---|---|---|
| 4,206,946 | 6/1980 | Maertens | 297/378.12 X |
| 4,475,763 | 10/1984 | Hamatani et al. | 297/378.13 X |
| 4,561,694 | 12/1985 | Mouri et al. | 297/378.13 |
| 4,636,005 | 1/1987 | Bolz et al. | 296/65.1 X |
| 4,684,175 | 8/1987 | Trutter | 296/65.1 X |
| 4,779,927 | 10/1988 | Trutter et al. | 297/378.13 |
| 4,909,571 | 3/1990 | Vidwans et al. | 297/378.13 X |
| 5,328,243 | 7/1994 | Akiyama | 297/378.12 |
| 5,582,453 | 12/1996 | Leuchtmann et al. | 297/378.13 X |
| 5,603,550 | 2/1997 | Holdampf et al. | 297/378.12 X |
| 5,664,839 | 9/1997 | Pedronno et al. | 297/378.13 |
| 5,692,803 | 12/1997 | Luik et al. | 297/378.12 |
| 5,716,100 | 2/1998 | Lang | 297/378.12 |

FOREIGN PATENT DOCUMENTS

| | | |
|---|---|---|
| 0 276 761 | 8/1988 | European Pat. Off. . |
| 0 688 695 | 12/1995 | European Pat. Off. . |
| 44 44 122 | 12/1994 | Germany . |

*Primary Examiner*—Jose V. Chen
*Assistant Examiner*—Rodney B. White
*Attorney, Agent, or Firm*—Pollock, Vande Sande & Amernick

[57] ABSTRACT

The device includes an unlocking control button sliding in a guide well between (1) a position indicating unlocking, where the head of the button is clearly visible outside of the well, and (2) an unlocking control position where a lower end of the button pushes a lock into an unlocking position enabling the disengagement of a locking component. The device includes a spring returning the button to its position indicating unlocking, and control means to bring the button into an intermediary position where its head is more or less flush with the edge of the well, only when the locking component is in the locking position.

9 Claims, 4 Drawing Sheets

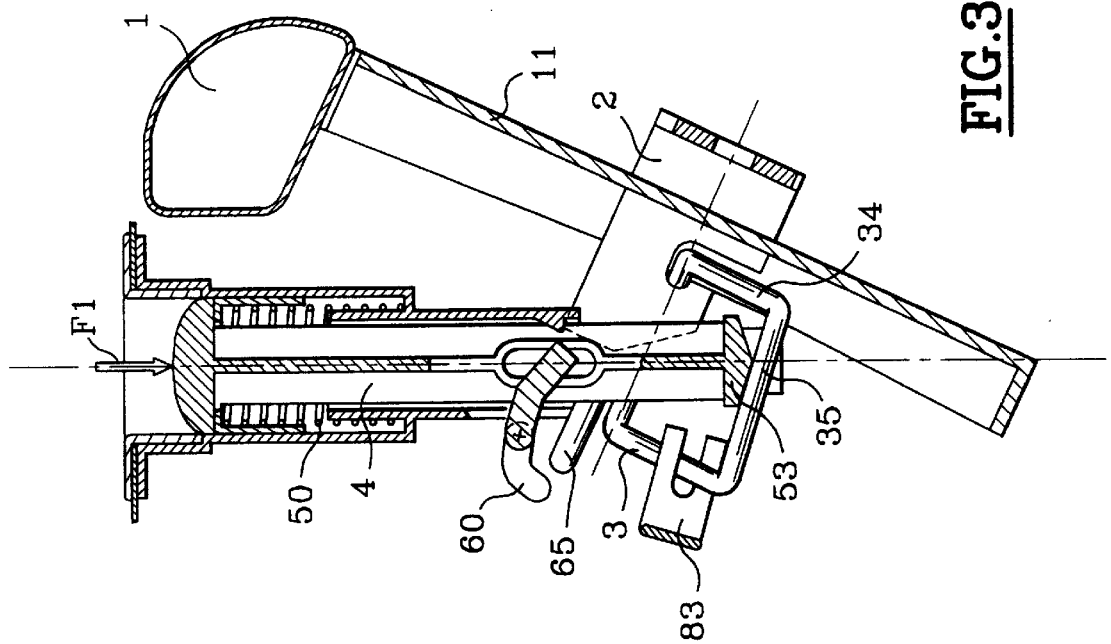
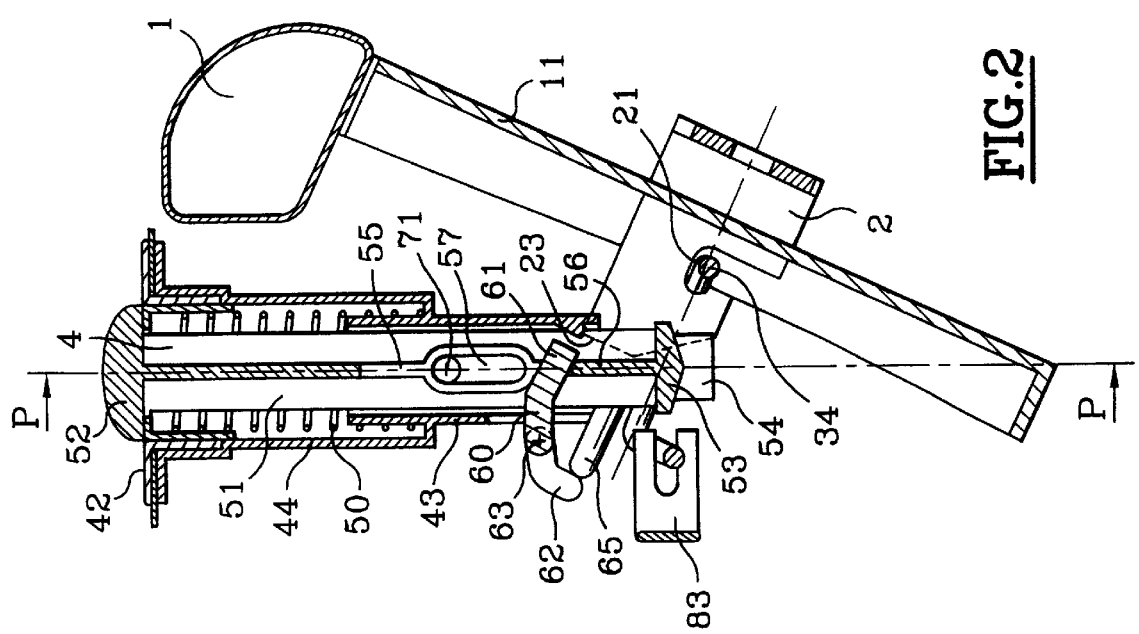

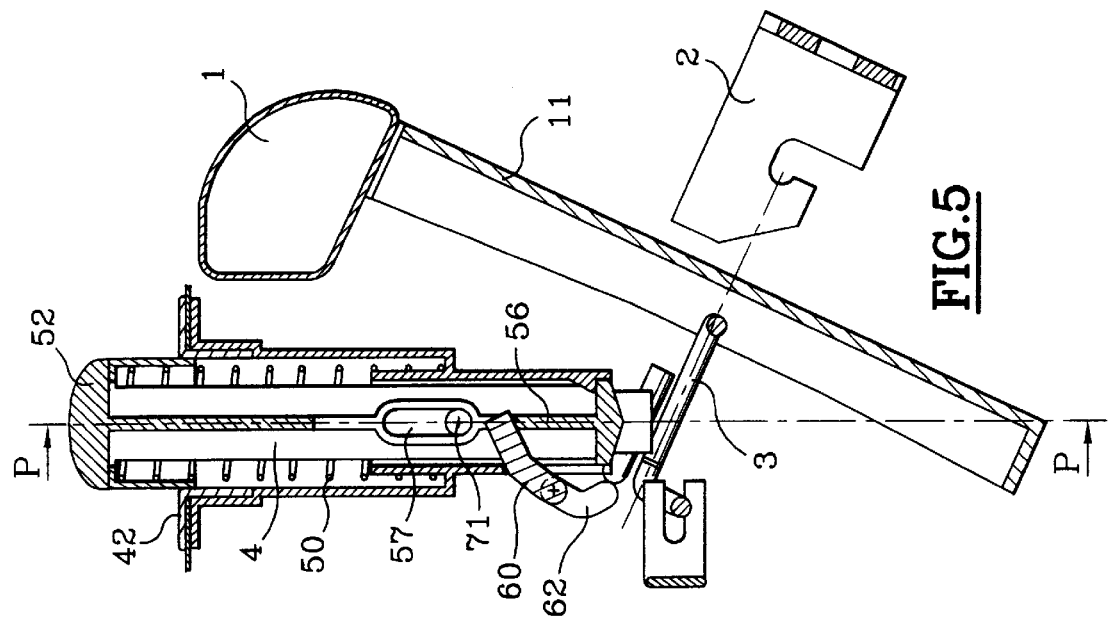
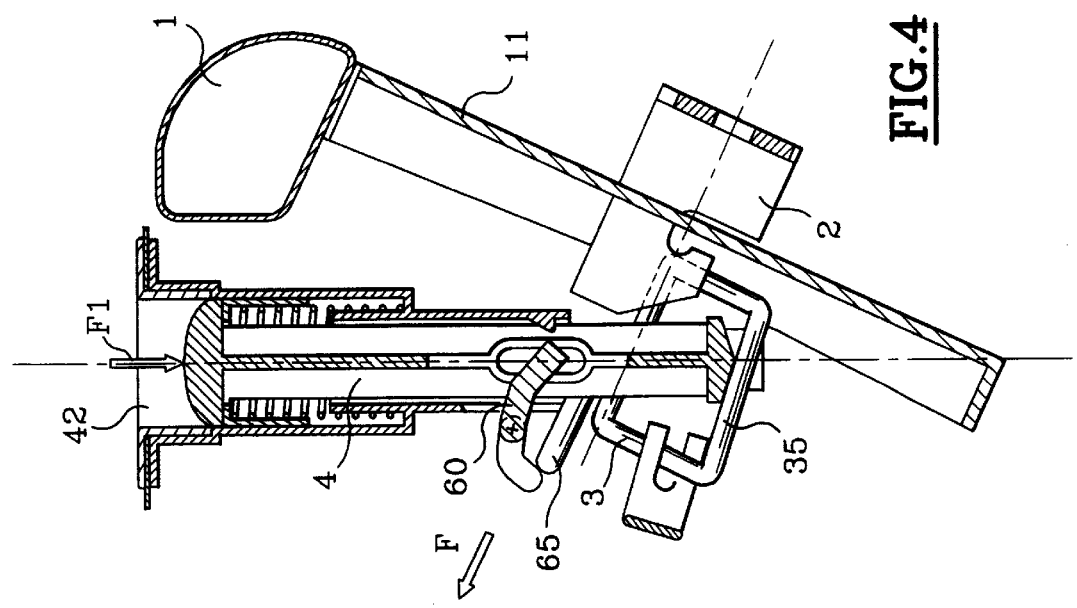

DEVICE FOR LOCKING A MOVABLE ELEMENT OF AN AUTOMOBILE VEHICLE SEAT ONTO A FIXED ELEMENT WITH UNLOCKING INDICATION

FIELD OF THE INVENTION

This invention concerns a device for locking a movable element of an automobile vehicle seat onto a fixed element, such as locking the folding backrest of the rear seat in raised position.

BACKGROUND OF THE INVENTION

Folding down the backrest onto the seat especially enables objects larger than the boot of the vehicle to be loaded into the boot. We already know of fully or partially folding backrests such as the backrests usually called "⅓–⅔".

Generally speaking, such locking devices must ensure automatic locking when the backrest is raised; unlocking being achieved by control means such as a push button.

Known locking systems include a hook attached to the car body inside the boot and a movable elastic recall locking element, installed on the backrest, which latch onto the hook when the backrest is raised. An unlocking control element, for example a button, also installed on the backrest, enables the locking element to be disengaged from the hook to unlock the backrest.

A locking system such as this is notably described in document FR-A-2 720 985, the hook penetrates, when the backrest is raised, into a window in the rear wall of the backrest, and the locking element consists of a wire ring, elastically deformable, placed behind this window and onto which the hook latches to ensure locking.

For current use of a vehicle equipped with a rear seat with a folding backrest, the backrest must be correctly locked to prevent it from inadvertently folding down and placing the user in danger subsequent to the intrusion of luggage into the vehicle's passenger compartment. It is therefore advisable to be able to easily ensure that the backrest is effectively locked.

For the system described in the above mentioned document, the unlocking button is connected to the ring and stands proud of the backrest when the ring is not deformed, that is in unlocked position, when the hook is not inserted in the window. When the hook starts to engage in the window in the backrest, it pushes back the locking element and retracts the button which is connected to it inside the well guiding this button, until the hook reaches the locking position where the locking element returns elastically into a slot in the hook. The various elements are sized so that in this locking position, the button does not stand proud of the backrest.

However, in the intermediary position, where the hook pushes back the locking element and before it returns to locked position, the button is also no longer visible. Thus, the fact that the button is visible indicates that locking is not effective, but, conversely the fact that the button is not visible does not guarantee that locking has been correctly achieved. The indication given by the fact that this button is visible or not is not therefore sufficiently reliable.

A similar problem exists in all cases where the unlocking control element is not connected to the locking element and returns elastically into position when released, as the position of this control element is the same whether locking is effective or not.

Other locking systems are known which generally include an unlocking button acting on a movable locking element to place the latter in an unlocked position. These buttons are conventionally accessible from the inside of the passenger compartment of the vehicle. The result is that, even if the boot cannot be opened from the outside, it is accessible to a person who has entered the passenger compartment.

BRIEF DESCRIPTION OF THE INVENTION

The purpose of this invention is especially to solve the above mentioned problems and aims particularly in ensuring a reliable indication of non-locking or of incomplete locking.

The aim of the invention is also to prevent access to the boot from the passenger compartment of the vehicle by locking securing means preventing unlocking from the passenger compartment when the said locking securing means are activated.

Generally speaking, the aim of the invention is therefore first to ensure a reliable indication of non-locking or of incomplete locking. Its aim is also the securing or the unsecuring of the locking action whether the backrest of the seat is locked or not while allowing the relocking of the seat when the securing means have already been activated and without the locking then cancelling the securing action.

With these targets in mind, the subject of the invention is a device for locking a movable element of an automobile vehicle seat onto a fixed element, this device including a locking component attached to one of the first said elements and penetrating, in a locking position, into a window made in the second element, a movable lock attached to the second element and adapted to cooperate, in the said locking position, with the said locking component, and an unlocking control button installed so as to slide in a guide well between a position indicating unlocking where the upper end of the button stands proud of the upper edge of the well and an unlocking control position where the said upper end of the button is located inside the well and where the lower end of the button pushes the lock into an unlocking position authorizing the disengagement of the locking component.

According to the invention, this device is characterized in that it includes a spring returning the button into its position indicating unlocking and button movement control means to place the button in an intermediary position where the upper end of the button is more or less flush with the edge of the well, these control means being arranged so as to be activated by the locking component only when the said locking component is in the said locking position.

The button is therefore always pushed towards a position where its upper end stands proud of the well, except when the locking component is engaged in the window in locking position. As the lock is then automatically elastically recalled by engaging with the locking component, it is certain that locking is effective when the upper end of the button is not clearly visible outside of the well.

According to a particular arrangement of the invention, the said control means include a rocker installed so as to pivot around an axis orthogonal to the direction of movement of the button and including at one of its ends a first arm extending radially inside the well and mating with a stop of the button, the pivoting of the rocker being induced by the locking component when the said locking component is placed in the locking position, for example by a pushing action exerted by the locking component on a second arm of the rocker which extends radially opposite the insertion window.

According to a preferential arrangement intended to allow reliable and easy securing of the locking action, the device includes securing means movable between a secured position where they limit the movement of the button between the position indicating unlocking and the intermediary position, and an unsecured position where the button can be placed in the unlocking control position.

This arrangement allows locking to be secured not only when the device is locked but also when it is in unlocked position. In secured position, the securing means do not prevent the movement of the button from the position indicating unlocking to the intermediary position and vice-versa but they prevent movement up to the unlocking control position. In addition, it will be noted that, in the case when securing is achieved when the device is unlocked, not only does it not prevent later relocking but also the securing action persists after the said relocking.

According to a preferential arrangement, the securing means include a rod which can move axially in a direction transverse to the direction of movement of the button and which can engage, in the said secured position, in a longitudinal aperture of the button so as to allow movement of the button only over a distance corresponding to the length of the aperture. Thus, when securing action is activated, the movement of the button to the unlocking control position is prevented by the stop of the upper end of the aperture of the said securing rod.

In particular, the movement of the securing rod can be controlled by electromagnetic control means placed within the thickness of the backrest, or by other control means inaccessible from the passenger compartment of the vehicle when the backrest is raised and locked, for example accessible only from the inside of the boot.

Other characteristics and advantages will appear in the description that will be given of a device in compliance with the invention used for the locking of a folding backrest of the rear seat of a car.

BRIEF DESCRIPTION OF THE FIGURES

Refer to the appended drawings on which:

FIG. 2 shows a cross section view of the device in the locked position,

FIG. 3 shows a corresponding view when an action is exerted on the button to ensure unlocking, FIG. 4 shows the device just after the disengagement of the hook from the lock, the pressing action on the button being maintained, FIG. 5 shows the device in the unlocked position.

DETAILED DESCRIPTION OF THE INVENTION

Figure 1:
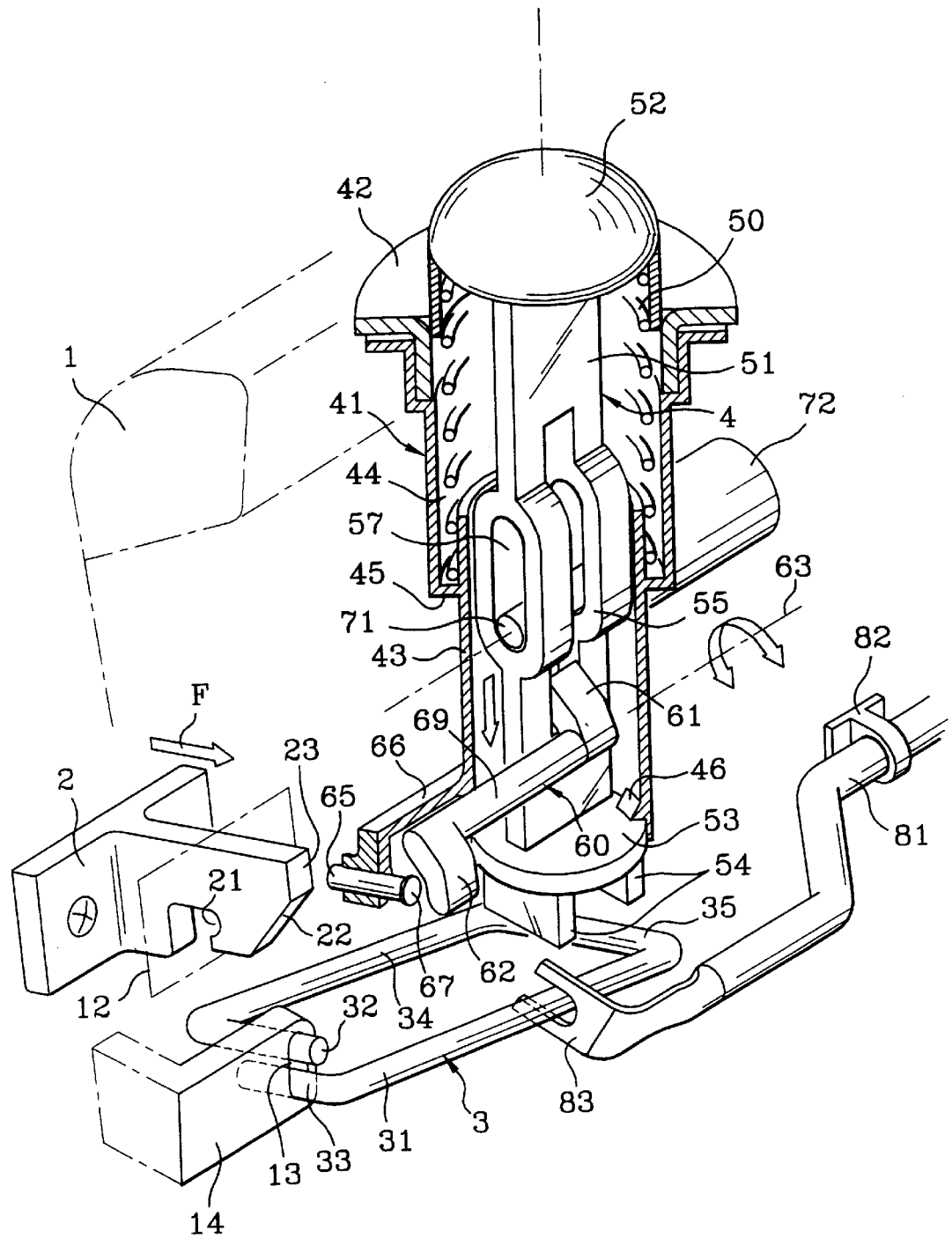
FIG. 1 shows a perspective and cutaway view of the device.
Figure 8:
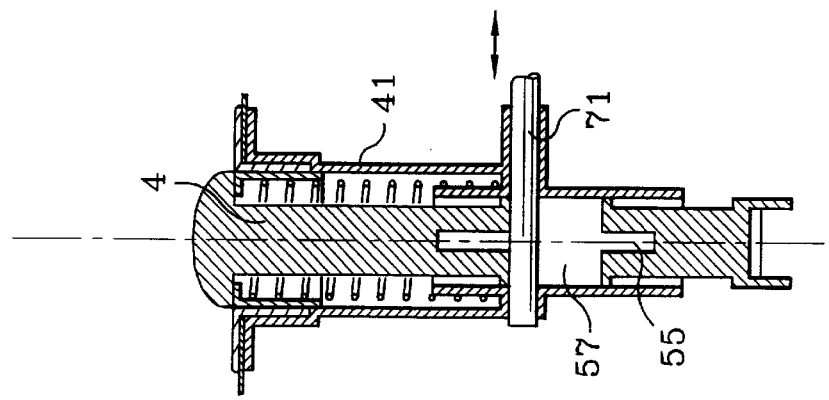
FIGS. 7 and 8 show a cross section view through P—P marked on FIGS. 2 and 5, the device secured in unlocked position and in locked position respectively.
Figure 7:
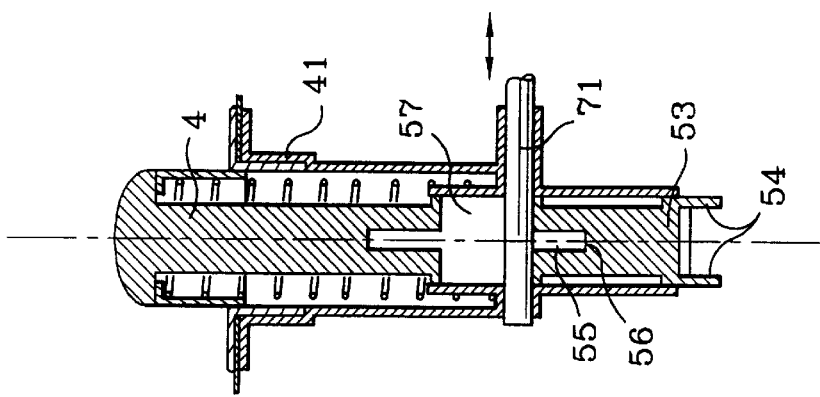

The drawing of FIG. 1 shows the layout of the device on the backrest of seat 1, of which only the upper edge is shown, and the locking component consisting here of a hook 2, attached for example to an inner wall of the boot of the vehicle. The backrest 1 is shown unlocked, in start of tipping position in direction shown by arrow F.

The rear wall 11 of the backrest, which can be seen more clearly on FIGS. 2 to 6, includes a window 12 in front of which, within the thickness of the backrest, a lock 3 is placed, and into which the hook 2 is inserted when the backrest is raised.

The lock 3 here consists of a metal wire shaped to form a ring 31 whose ends 32, 33 are placed parallel to each other and offset. These ends 32, 33 are retained in an elongated hole 13 in a support 14 attached to the backrest 1. One side 34 of the ring extends to against the wall 11, crosswise to the window 12, and engages, in locked position, in a notch 21 of the hook, thus preventing the extraction of the said hook from the window.

As it can be easily understood, pressing on the edge 35 of the ring opposite the said ends 32, 33 causes elastic deformation of the ring and a downwards movement of the side 34 which disengages from the notch 21 of the hook to free the latter.

The front end 22 of the hook 2 is inclined so as to push the side 34 of the ring 3 downwards when the hook 2 is inserted in the window to ensure automatic locking as soon as this side can return to its stable position, by the elastic recall of the ring, by insertion into notch 21. For further details on a locking system of this type and its advantages, refer to the above mentioned French document FR-A-2 720 985 the descriptive contents of which are included here by reference.

The unlocking control consists of a button 4 sliding in a guide well 41 attached to the backrest and equipped with a cover 42 placed on the upper edge of the backrest.

The button 4 includes a rod 51 guided in translation in a lower section 43 of the well. The rod 51 is equipped at its upper end with a head 52, or pushbutton, of a bright color and sliding in the cover 42 and in an upper section 44 of the well with a diameter greater than the lower section. The lower end of the rod 51 is located above the side 35 of the ring 31 and shaped so that it can bear on the said side 35 and move it downwards when the head of the button 52 is pressed. For this purpose, it includes a thrust plate 53 in the form of a disc from which extend downwards two lugs 54 which take up a position on either side of the side 35 of the ring to guarantee that the lower end of the rod 51 is held in position above the said side 35 of the ring without these parts being connected.

A compression spring 50 is placed around the rod 51 inside the upper section 44 of the well, between the head 52 of the rod and a shoulder 45 connecting the lower and upper sections, 43 and 44, of the well and pushes the button upwards to a position indicating unlocking (as shown on FIG. 1) where the head of the button clearly emerges above the cover 42. The upwards movement of the button is limited by stops 46 extending radially towards the inside from the lower section 43 of the well and under which the thrust plate 53 bears.

A rocker 60 consisting of a shaft 69 bearing at each end an arm 61, 62 extending more or less radially from the said shaft, is installed so as to pivot around an axis 63 orthogonal to the direction of movement of the button in a bearing, not shown, attached to the lower section 43 of the well. One of the first said arms 61 extends inside the well and inserts into a slot 55 made longitudinally in the rod 51 of the button. The other arm 62 extends opposite the window 12 and, more precisely, just opposite the nose 23 of the hook 2. A pin 65 is installed so as to slide in a bore of a support 66 also attached to the well, the sliding direction being orthogonal both to the axis 63 and the direction of movement of the button, that is positioned more or less in the insertion direction of the hook 2. The pin 65 is positioned so as to be pushed by the nose 23 of the hook 2 and to bear on the arm 62 when the hook 2 reaches locking position, which causes the pivoting of the rocker 60 and the bearing of the first arm 61 on the stop formed by the lower edge 56 of the slot 55, which in turn causes the downwards movement of the button 4 as will be explained later in more detail. The pin 65 is preferably equipped with a head 67 located between the support 66 and the arm 62 to prevent it from leaving its guide bore in the direction of window 12.

A longitudinal aperture 57 is also made in the rod 51 of the button 4 into which can penetrate, by passing through the wall of the well, a securing rod 71, movable in its axial direction perpendicular to the direction of movement of the button. The movement of this securing rod is controlled for example by an electromagnet 72 placed beside the well within the thickness of the backrest.

The operation of the device will be easier to understand in the description which will be made in relation to FIGS. 2 to 8.

FIG. 2 shows the position of the device when the backrest 1 of the seat is raised and locked. In this position, the side 34 of the lock is engaged in the notch 21 of the hook 2. The pin 65 bears on the nose 23 of the hook and holds the rocker 60 in the position shown, the second arm 61 of the rocker forming a stop holding the button in its intermediary position, the spring 50 being partially compressed and the head 52 of the button being flush with the cover 42. It can be seen that the securing rod 71, engaged in the aperture 57, prevents all downward movement of the button as can be seen also on FIG. 8.

FIG. 3 shows unlocking activation by a pushing action (arrow F1) exerted on the head of the button after unsecuring action by withdrawal of the securing rod 71 from the aperture 57. This pushing action causes the button to slide downwards, overcoming the load of the spring 50, and the thrust plate 52 to bear on the side 35 of the lock which then deforms elastically and disengages the side 34 from the notch 21 of the hook. The backrest of the seat can then be folded down.

FIG. 4 shows the start of the folding down movement, the pushing action F1 on the button being maintained and the backrest starts to move away from the hook in the direction shown by arrow F.

On the drawing of FIG. 5, the hook 2 is completely disengaged from the window 12 and the pushing action F1 has been released. The lock 3 has elastically returned to its rest position and the button 4 is pushed upwards by the spring 50. By moving upwards, the edge 56 of the slot 55 has caused the rocker 60 to pivot; this pivoting then being possible due to the fact that the nose of the hook no longer bears on the pin 65 which is pushed back by the arm 62 of the rocker. The head 52 of the brightly colored button can then be clearly seen above the cover 42 and clearly indicates unlocking. It can be seen that in this position, also shown on FIG. 7, the securing rod can again be inserted into the aperture 57.

Figure 6:
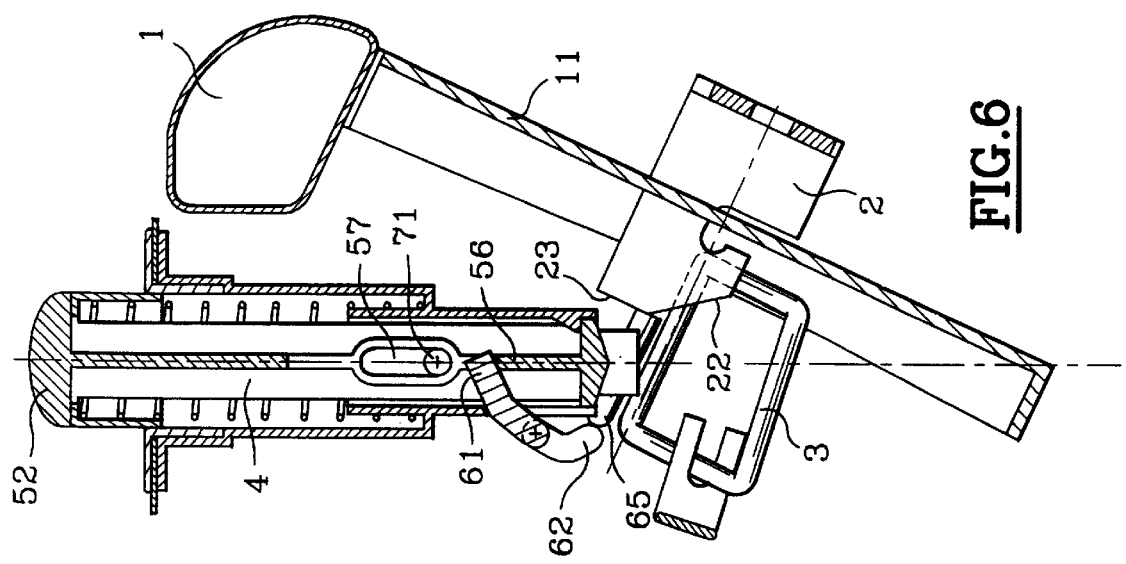
FIG. 6 shows the device in a position where the hook pushes back the lock, just before the effective locking or just after unlocking but with the button released.

FIG. 6 shows the position of the device just before relocking. Following the raising of the backrest, the hook 2 has started to penetrate into the window 12 and has pushed back the lock by its inclined section 22. On account of the fact that the nose 23 of the hook has not yet pushed on pin 65, the rocker 60 has remained in its previous position and its arm 61 has not yet caused the button to move downwards. Even though the hook 2 is already engaged with the lock, the head 52 of the button remains clearly visible and indicates that locking is not effective which would not necessarily be well perceived by looking only at the position of the backrest, which is very close to the locking position. It is only when the hook has inserted at end of travel in the window 12 and the lock has then engaged elastically in notch 21, to ensure the locking, that the movement of the pin 65 will have pivoted the rocker and returned the button to the intermediary position shown on FIG. 2.

When the backrest of the seat is of the ⅓–⅔ type, a locking device is conventionally placed on each part of the backrest. However, for a single-piece folding backrest which extends along the complete width of the vehicle, the backrest is equipped with two locking devices located on each side respectively. To facilitate the unlocking of the backrest, due to the fact that it may be difficult to simultaneously activate the buttons of the two devices as they are spaced far apart, linkage means are provided connecting the locks of the said devices so that the movement of the lock of one of the devices, caused by an action on the corresponding button, leads to a simultaneous and corresponding movement of the lock of the second device. Such means are partially illustrated on FIG. 1 and include a bar 81 extending along the width of the backrest and installed so as to pivot in bearings 82 attached to the backrest. At each end, this bar includes a fork 83 extending radially and engaging onto the lock 3 at a distance from the support 14. A pivoting movement of the ring 31 of a lock therefore causes the corresponding pivoting movement of the ring of the lock located on the other side of the seat. Thus, it is sufficient to press the button of only one of the two locking devices to also activate the unlocking of the other device.

The invention is not limited to the design described above only as an example. In particular, the lock and the button may be located on a fixed wall of the boot and the locking component attached to the backrest. The rocker system may also be modified or replaced by a system ensuring the same functions, that is, returning the button to its intermediary position only when the locking component is in its locking position. The hook and the elastically deformable ring described above may also be modified or replaced by other locking components and locks without falling outside the scope of this invention.

We claim:

1. Device for locking a movable element of an automobile vehicle seat onto a fixed element, this device including: a locking component attached to a first of the elements and penetrating, in a locking position, into a window made in a second of said elements, a movable lock attached to the second element and adapted to cooperate, in the locking position, with the locking component, and a button for activating unlocking and installed so as to slide in a guide well between a position indicating unlocking, where an upper end of the button is exposed from an upper edge of the well and, an unlocking control position where the upper end of the button is located inside the well while a lower end of the button pushes the lock into an unlocking position enabling disengagement of the locking component, the device further including a spring returning the button to its position indicating unlocking, and button movement control means to place the button in an intermediary position where the upper end of the button is substantially flush with an edge of the well, the control means being arranged so as to be activated by the locking component only when the locking component is in the said locking position.

2. Device in accordance with claim 1, further wherein the control means include a rocker installed so as to pivot around an axis orthogonal to a direction of movement of the button and including at one of its ends a first arm extending radially and inside the well and cooperating with a stop of the button, the pivoting of the rocker being caused by the locking component when the locking component is placed in the locking position.

3. Device in accordance with claim 2, further wherein the rocker includes at its other end a second arm extending radially opposite the window so that it can be pushed back by the locking component inserted in the window.

4. Device in accordance with claim 1, further comprising securing means moving between a securing position where they limit the movement of the button between the position indicating unlocking and an intermediary position, and an unsecuring position where the button can be placed in an unlocking control position.

5. Device in accordance with claim 4, further wherein the securing means include a rod movable axially in a direction transverse to a direction of movement of the button and which can engage, in the securing position, a longitudinal aperture of the button to enable in the securing position movement of the button only between the position indicating unlocking and the intermediary position.

6. Device in accordance with claim 5, further wherein the movement of the rod is controlled by electromagnetic control means.

7. Device in accordance with claim 1, further wherein the spring is installed inside the well between a shoulder of the well and a head of the button at the upper end of the button.

8. Device in accordance with claim 1, wherein the lock further comprises a spring wire in the form of a ring, with ends that are retained in a support connected to the second element, and a lower end of the button is placed above a section of the ring, away from its ends, and shaped so as to push the section of the ring when the button is placed in its unlocking control position.

9. Device in accordance with claim 1, further comprising linkage means connecting a plurality of locks so that the movement of one lock, caused by an action on the corresponding button, causes a simultaneous and corresponding movement of other locks.

* * * * *